United States Patent [19]
Rushforth

[11] 3,977,513
[45] Aug. 31, 1976

[54] CART CONVEYOR SYSTEM
[75] Inventor: George T. Rushforth, Costa Mesa, Calif.
[73] Assignee: Sun Chemical Corporation, New York, N.Y.
[22] Filed: May 28, 1974
[21] Appl. No.: 473,346

[52] U.S. Cl. .............................. 198/38; 198/155; 104/88; 214/62 A; 214/63
[51] Int. Cl.[2] .................. B65G 43/00; B65G 47/38
[58] Field of Search ............ 198/38, 155, 154, 163; 214/62 A, 58, 63; 104/88; 105/241 R, 241 C, 268

[56] References Cited
UNITED STATES PATENTS

| | | | |
|---|---|---|---|
| 2,290,844 | 7/1942 | Smith | 214/58 |
| 3,318,435 | 5/1967 | Scott | 198/38 |
| 3,463,298 | 8/1969 | Harrison | 198/155 |
| 3,550,748 | 12/1970 | Hauer | 198/38 |
| 3,848,728 | 11/1974 | Leibrick et al. | 198/155 |

FOREIGN PATENTS OR APPLICATIONS

| 1,208,893 | 10/1970 | United Kingdom | 198/155 |
|---|---|---|---|

Primary Examiner—Robert J. Spar
Assistant Examiner—James M. Slattery
Attorney, Agent, or Firm—Cynthia Berlow

[57] ABSTRACT

Newspaper stacks are transported from stacking and tying equipment to a loading dock by a closed-loop endless train of carts moving on a contoured track which can allow horizontal or vertical movement of the cart train. The individual carts may be loaded, while in motion, with one or two stacks at cart loading stations along the closed-loop path from bundle entry devices which are interlocked and synchronized with the moving cart train. The contents of each cart can be discharged at preselected discharge regions in a truck loading dock by tilting the track and the cart at a 30° angle as the train passes the loading dock, and selectively opening a bundle retaining gate provided on each cart, to enable gravity discharge of the stacks to the desired loading dock location.

8 Claims, 12 Drawing Figures

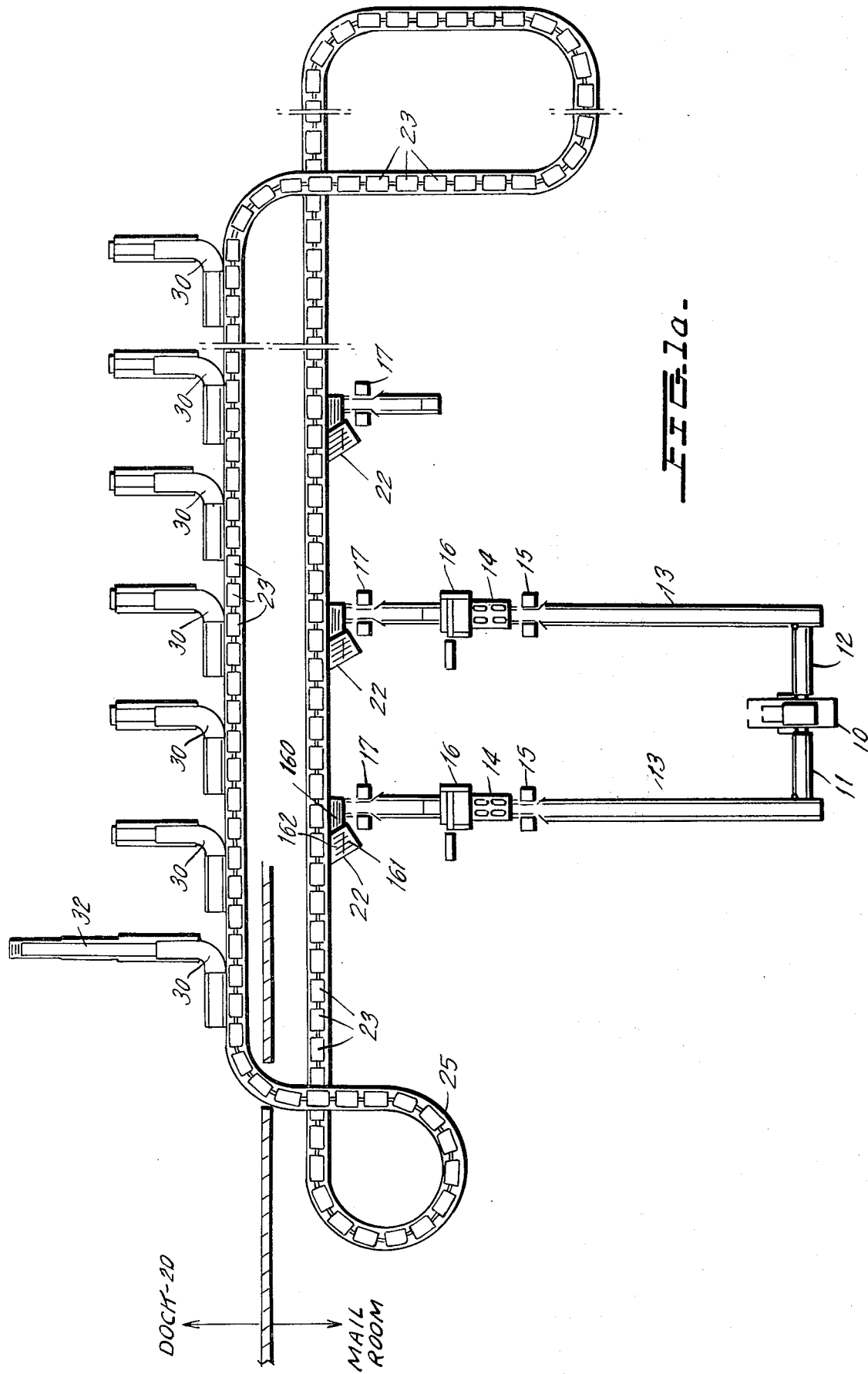

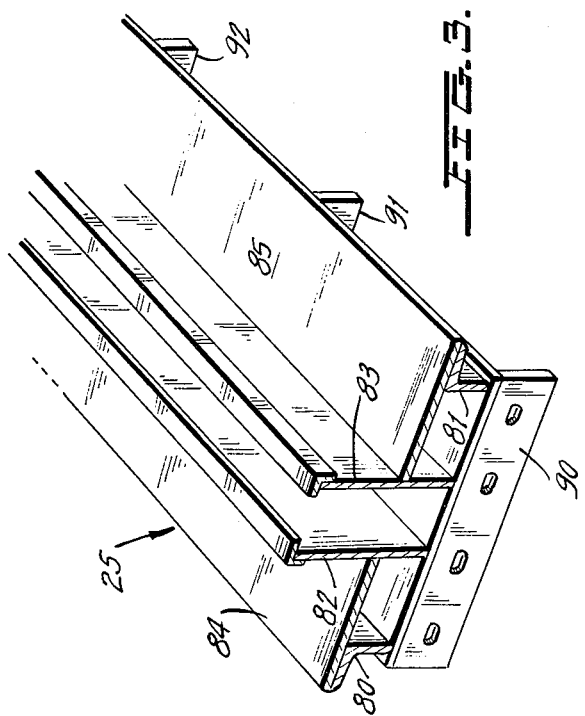
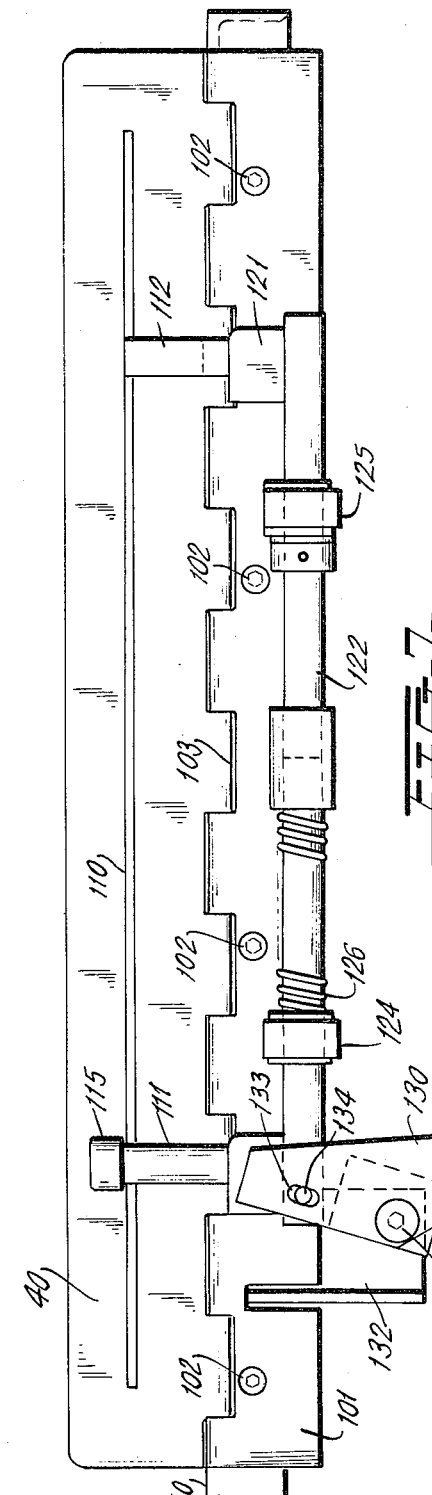
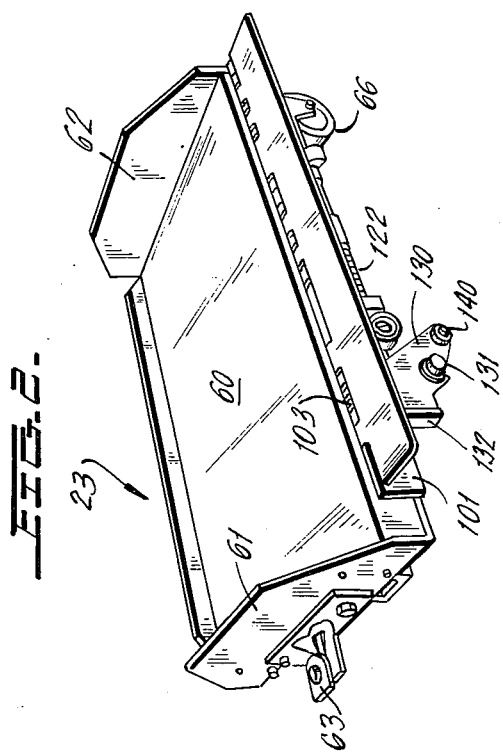
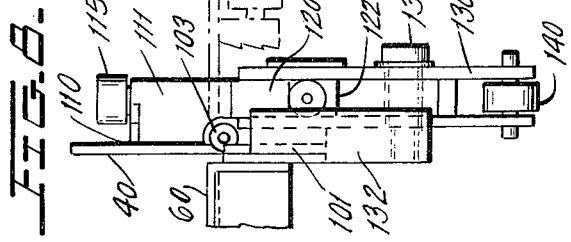

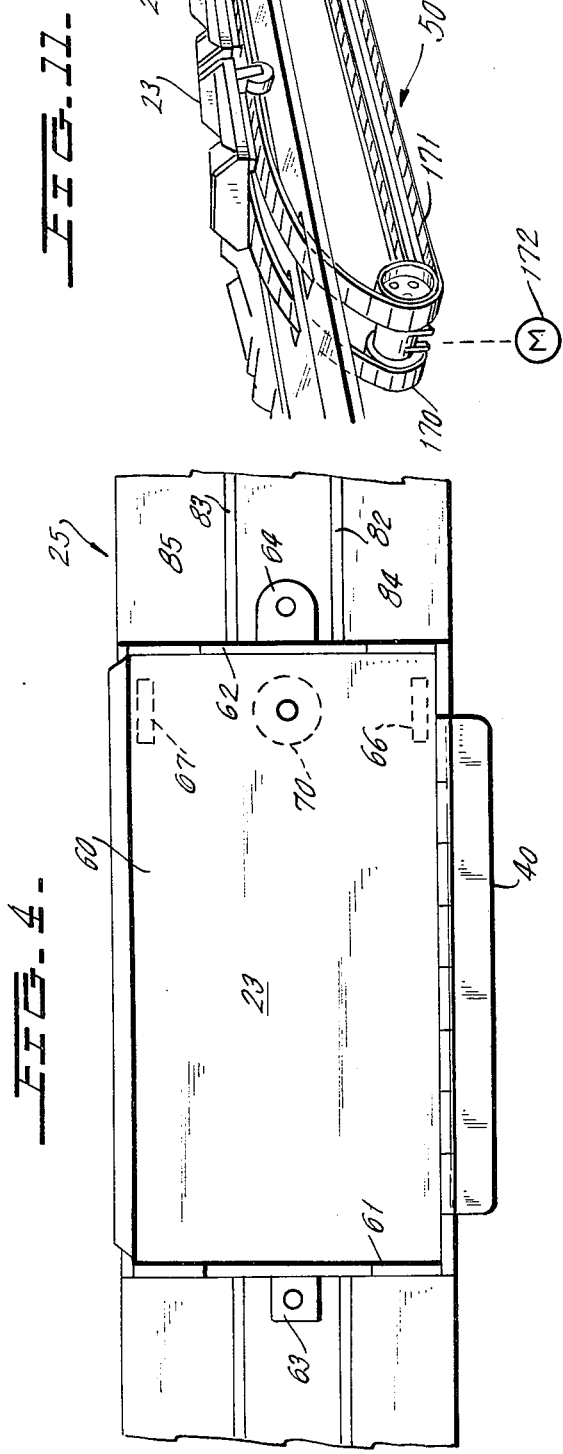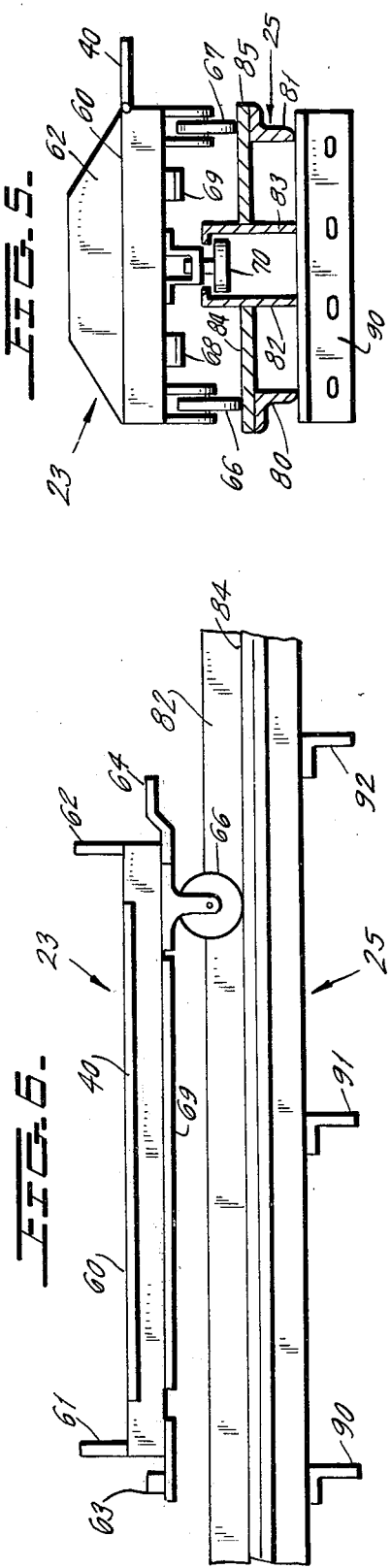

CART CONVEYOR SYSTEM

BACKGROUND OF THE INVENTION

This invention relates to a novel conveyor system for conveying bundle-carrying carts around a closed loop and between bundle loading and bundle discharge regions, and more specifically relates to a novel conveyor for a newspaper mail room and for conveying newspaper stacks from stack tier regions to a loading dock, which may be at a different floor elevation than the stack tiers.

In the conventional newspaper mail room, newspapers from a press are conveyed to one or more stacker devices which stack the newspapers in stacks of a given number, to form stacks which might be about 15 inches in height. Each of the stackers then discharge their stacks onto one or more roller conveyors which carry the stacks to bottom-wrap applying devices and then to bundle tier devices. Each of the bundle tier devices were then connected to a dock conveyor by a series of conveyors and bundles were manually and/or automatically loaded from the dock conveyor. The bundles were then pushed off the dock conveyor when they reached a desired point at the unloading area. The prior art system requires considerable manual labor in the loading and unloading system, and limits the speed at which the distribution system can operate.

BRIEF DESCRIPTION OF THE INVENTION

In accordance with the invention, the individual carts of a closed loop cart train are provided with bundle retention gates and the track and carts are tilted to an angle which causes the bundles to slide, due to gravity, against the gates when the carts reach the unloading dock area. The gates are then opened when it is desired to discharge the bundles from the cart and into a suitable discharge chute. The bundles are loaded into the carts by suitable entry devices which automatically determine the presence of an empty cart and load bundles into the cart when the cart passes the entry device. In a typical system, there would be a train of steel carts pivotally connected end to end to form an endless train. Each cart might be three feet long to receive two tied stacks of newspapers. The newspaper stacks are loaded over an open bundle retention plate which is cammed to a latched-closed position after the cart passes the bundle receiving area. The track then tilts the carts about 30° from the horizontal when the carts reach the unloading region, and the retention plates hold the bundles until they are opened by the operation of their latch to allow bundles to slide off the smooth bottom surface of the carts and toward a discharge chute.

The track carrying the carts is a fabricated steel structure designed in segments for ease of transportation and installation into a continuous closed loop. Note that the loop may change in vertical height if the bundle tying apparatus is at a different height than the truck loading dock. The underside of each cart contains two swivel wheels which roll on the track and a horizontal guide wheel which is captured between two vertical track members for cart guidance.

In-line caterpillar type drive systems are installed at several locations along the track for driving the carts around their closed path in a quiet and smooth manner. At each drive, two heavy duty roller chains are driven through an overrunning clutch by a squirrel cage induction drive motor. Rubber covered steel driving pads are mounted on the chains and engage rubber driving strips fixed beneath each cart to propel the train of carts. During engagement between the chainmounted driving pads and the carts, the cart is lifted slightly off the track and is supported solely by the chains through the engaging rubber surfaces. This assures smooth, positive and extremely quiet power transmission for driving the cart train. Other drive systems could be used.

The cart train will run along a loading truck dock, banked at an angle which may be 30°, at a height above the dock sufficient for any necessary clearance to objects at ground level. A discharge chute is provided at each of these positions and is designed to receive either one or two bundles from the carts which pass the position and to deposit these bundles in a controlled way onto a conveyor which conveys the bundles onto a truck loader. A pneumatically-operated latch release mechanism is positioned at each chute location along the dock for opening the bundle-retaining gate of any cart which is to be off-loaded at that particular chute.

The automatic bundle entry device for loading bundles into the moving carts is controlled from suitable circuits which monitor the presence of stacks in the entry device and the presence of an empty cart. Single bundles or pairs of bundles are moved to an entry position in the entry device by three spaced chains which grip the bottom of the bundles. When the bundle load is to be loaded into an empty cart, the drive chains are lowered, and a pusher plate, operated by a second set of laterally moving chains, propel the bundles from their loading position in the entry device into the passing cart. The pusher plate is then retracted to begin a new bundle entry operation.

The novel system described above has numerous advantages over the prior art load and unload conveyor systems. Thus, about 50% less manpower is needed than most conventional mail room systems. The system also allows about 25% fewer dock positions than required by most conventional systems, and requires less space than most systems. The novel system further allows storage of bundles in motion to accommodate late truck arrivals and to anticipate arrival of trucks with high priority routes. Note further that the system lends itself to flexible centralized control so that trucks can come to any dock position for loading, and preassignment of trucks or routes to a particular dock is no longer necessary.

BRIEF DESCRIPTION OF THE DRAWINGS

FIG. 1a is a top plan view of a second embodiment of the system of the invention.

FIG. 2 is a perspective view of one cart of the present invention.

FIG. 3 is a perspective view of the track used to carry and guide the cart train of the invention.

FIG. 4 is a top view of a cart, such as the cart of FIG. 2 on the track of FIG. 3.

FIG. 5 is a front view of FIG. 4.

FIG. 6 is a side view of FIG. 4.

FIG. 7 shows the bundle receiving gate and gate latch for the cart of FIG. 2.

FIG. 8 is a front view of FIG. 7, and shows the gate in its lowered position in dotted lines.

FIG. 11 shows the caterpillar belt drive for the train of carts.

DETAILED DESCRIPTION OF THE DRAWINGS

Figure 1:
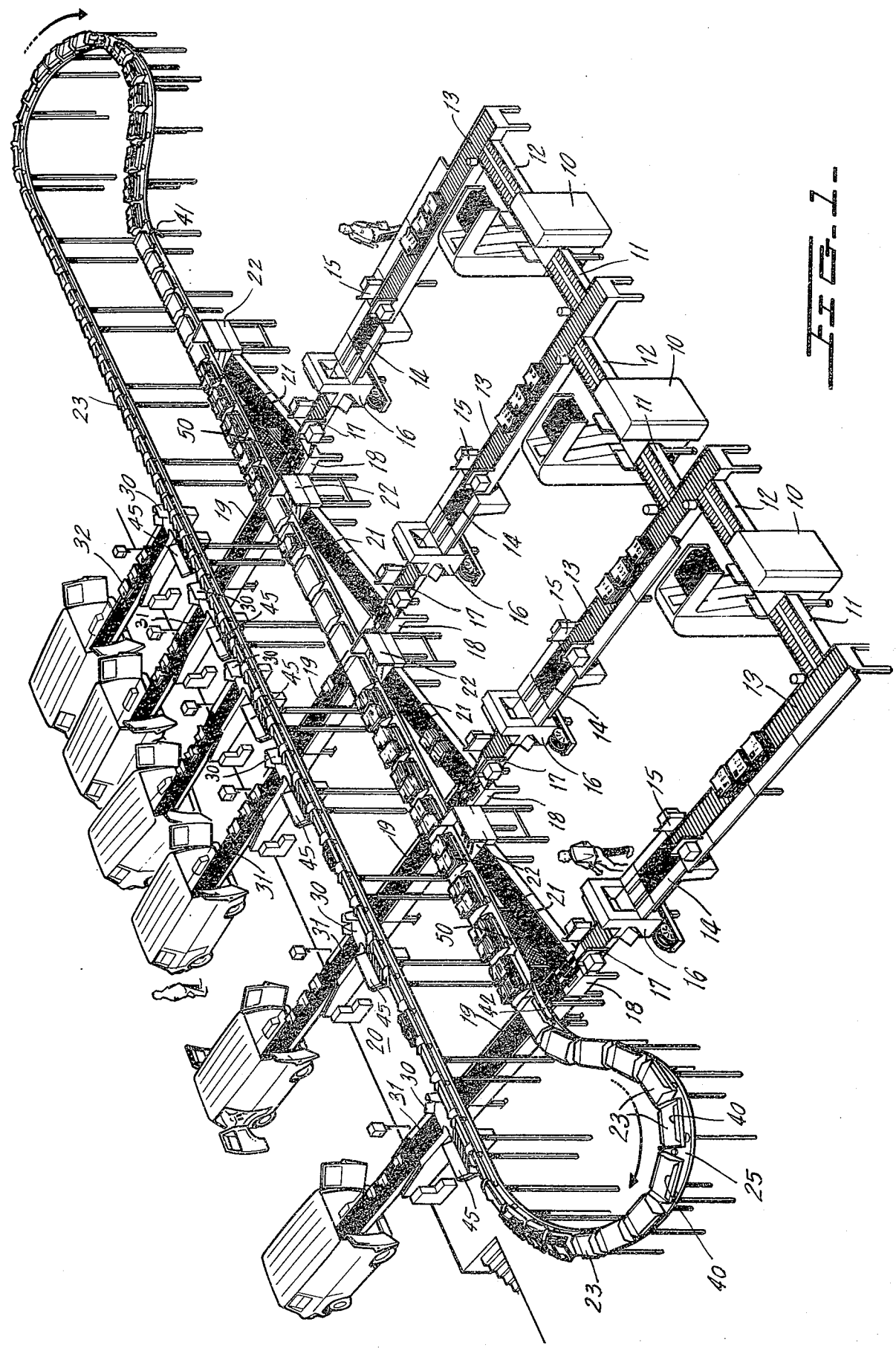
FIG. 1 is a perspective view of the system of the present invention.

Referring first to FIG. 1, the entire system is shown for a complete newspaper mail room and the delivery of stacked bundles to a loading area. Conventional overhead stream conveyors deliver newspapers (or other objects to be formed into a stack or bundle) to conventional counter-stackers 10 which form counted stacks of newspapers or the like. Note that any number of stackers could be provided, and the three stackers 10 are shown herein for illustrative purposes only. Stacks are then ejected either right or left on conveyors 11 and 12 from each stacker 10. The bundles then enter roller conveyors 13 and are carried toward bottom-wrap applying devices 14, which apply a protective sheet of material to the bottom of each bundle. One type bottomwrap device is shown in copending application Ser. No. 394,143, filed Sept. 4, 1973, now U.S. Pat. No. 3,881,297, in the name of George T. Rushforth, and assigned to the assignee of the present invention. A bundle pacer 15 is placed before each bottom-wrap device 14 to control the entry of devices into the bottom-wrap device and to prevent the entry of a second bundle before a first has been fully processed.

Figure 9:
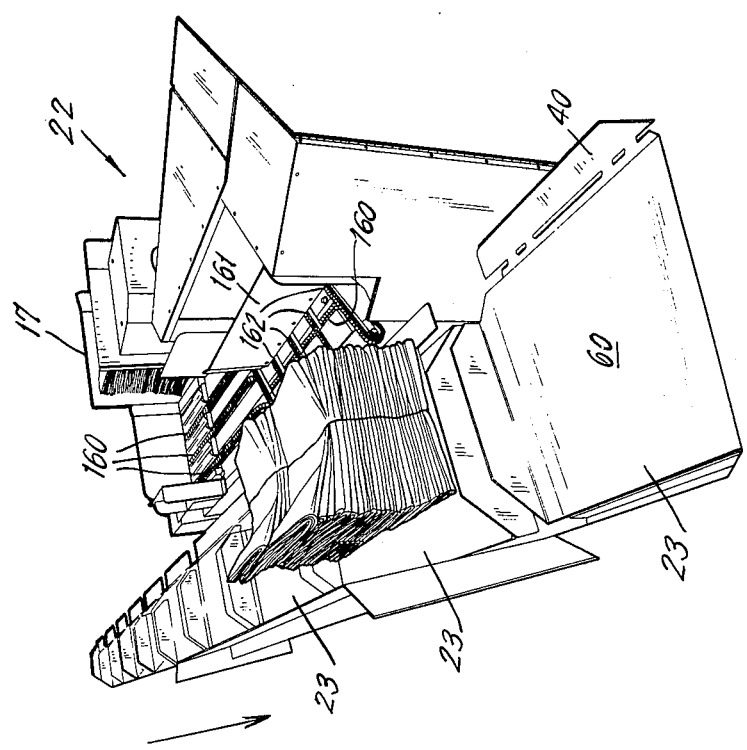
FIG. 9 shows a perspective view of the bundle entry device of the present invention.

The bundles then move through conventional bundle tiers 16, and then through pacers 17 which control the entry of bundles into the conveyor system and which prevent the overloading of the bundle entry devices. The tied bundles then move into bundle diverters 18 which can move the tied bundle straight ahead and along belt conveyors 19 which lead directly to the loading dock 20. Diverters 18 can also transfer bundles to conveyors 21 which lead toward bundle entry devices 22 (FIG. 9). Diverters 18 can also have the capacity (not shown) to off-load bundles on a gravity conveyor.

The bundle entry devices 22 extend along a loading region of an endless chain of carts 23, which will be later described in connection with FIGS. 2 and 4 to 8. Each of the carts is pivotally connected to another and is adapted to receive two bundles of newspapers (see FIGS. 9 and 10).

In a typical system, 100 to 500 carts form the closed train, and move at about 250 feet per minute. About 30 bundles per minute can be delivered from each entry device 22.

The train of carts 23 is carried on an elevated steel track assembly 25 which guides the carts 23 around their closedloop path. The track 25 has the configuration to be described in connection with FIGS. 2 to 5 and is generally horizontal, except for its length through the loading dock 20, where the track and carts tilt downward toward the loading region at an angle of about 30° to the horizontal.

The carts pass a plurality of bundle exit chutes 30 (FIG. 10) which can receive bundles from the various carts 23 under certain conditions to be later described. When bundles are gravity-loaded into chutes 30, they are discharged into truck-loading conveyors 31.

As will be later described, each of carts 23 has a bundle retaining gate 40 which can be raised after the cart is loaded with bundles to retain the bundles on the cart against the force of gravity when the cart is tilted. All gates are opened by a gate-latch opening mechanism 41, schematically illustrated as positioned at the beginning of the bundle entry region in FIG. 1, which operates the latch holding the gate closed as will be later described in connection with FIGS. 7 and 8. Once the carts 23 leave the entry device region, a fixed cam surface 42 closes each gate of each cart to allow its latch to set. This latch can be opened by a suitable pneumatic latch-tripping mechanism housed beneath the track 25 and disposed in front of each exit device 30 and operated by the electrical control and monitoring system (not shown) of each exit device 30. The bundles are initially stopped by backboards 45 at each exit device 30 and continue, by inertia, into the discharge chute.

The cart train is then propelled by a plurality of caterpillar type drive chain systems 50 which engage the bottom of each cart as the cart moves over the driven belt, as schematically shown in FIG. 11.

The operation of the general system of FIG. 1 can now be described. A central electronic control system, not described here, is used to appropriately program the operation of the system and to determine how many bundles are to be delivered to different loading docks, as required by the presence of a truck for a given route at the dock. The control system will also control the action of the pacers 15 and 17 in determining the supply of bundles to the system. If desired, each individual cart 23 may be coded so that the cart can be sensed at the entry and discharge devices by the control circuits. As all carts pass device 41, their gates 40 are unlatched and lowered. Suitable optical sensors then determine whether the cart is already loaded and, if not, one or two bundles will be loaded onto the cart from one of the bundle entry devices 22. Note that the cart may be loaded with only one bundle if there is a demand for a total odd count number of bundles. Once the entry device 22 loads its bundles onto a cart, the pacers 17 allow the loading of further bundles into the entry device. The carts 23 then pass cam 42 and the gates 40 are latched closed. As the track 25 reaches the dock 20, it begins to twist to a 30° bank, or whatever bank is needed for gravity-discharge of the bundles from the cart 23. The gates 40 prevent the discharge of bundles until the gates are opened. An appropriate sensing mechanism which is controlled from the central electronic control system then senses a cart with bundles approaching a given exit device 30 and, if that loading area requires bundles, the latch of the gate 40 of the particular cart 23 is released and the bundles on the cart are discharged by gravity. Note that, on their return to the mail room, each cart gate is unlatched at device 41 so that empty carts whose gates were closed by cam 42 in a prior loading cycle and whose gates were not opened at the dock 20 will have their gates reopened before entering the bundle entry area.

Note that the system of FIG. 1 permits the straight-through delivery of bundles on conveyors 19. This arrangement is useful to increase the supply of product to a given truck station, and also provides a backup for system failure.

FIG. 1a shows an alternative system to that of FIG. 1 which eliminates the straight-through delivery feature of FIG. 1 and shows how the system applies when the bundle-producing equipment is at a different vertical level than the loading dock. Thus, in FIG. 1a, the mail room apparatus may be several floors below the level of the dock area, with the track 25 carrying the bundles between the two elevations. In all other respects, the systems of FIGS. 1 and 1a are the same and similar remarks identify similar components.

The construction of a typical cart 23 is shown in FIGS. 2 and 4 to 8. Thus the cart is formed of a smooth, flat steel bottom 60 which is secured to upstanding end plates 61 and 62. The bottom of the cart 23 has pivotal connectors 63 and 64 which are adapted to be pivotally connectible to adjacent carts to form the train of carts described in FIGS. 1 and 1a. Clearly, any desired connection could be used, such as ball and socket joints, and the like. The bottom of the carts 23 receive wheels 66 and 67 and rubber strips 68 and 69 (FIGS. 5 and 6) which engage the caterpillar drive chain mechanism 50 (FIG. 11) as will be described. Carts 23 further have a horizontal wheel 70 (FIGS. 4 and 5) which serves to guide the cart on the track 25.

The track assembly 25 is shown in FIGS. 3 to 6 and consists of angles 80 and 81 and plates 82 and 83 which are welded to plates 84 and 85. Plates 84 and 85 serve as rails for receiving wheels 66 and 67 of carts 23, as shown in FIGS. 4, 5 and 6, while horizontal wheel 70 rides between and is free to rotate between beams or rails 82 and 83 to hold and guide one end of each cart on the track 25. A plurality of bolt angles 90, 91 and 92 are then welded to beams or angles 80 and 81 and receive the support framework for supporting the track 25.

Each of carts 23 is further provided with a latch mechanism for latching gate 40 closed. This mechanism is best shown in FIGS. 2, 7 and 8. As best shown, the gate 40 is hinged to a plate 101 which is bolted to the frame of cart 23 as by bolts 102 (FIG. 7). The interleaved hinge 103 contains a conventional hinge pin (not shown) and a biasing spring (not shown) which biases gate 40 to the open and dotted-line position in FIG. 8, and full-line position in FIG. 2. Note that the gate is flush or below the bottom surface 60 when the gate is open.

Gate 40 is also provided with a reinforcing rib 110, and has latch plates 111 and 112 (FIGS. 7 and 8) welded thereto. Note that plate 111 carries a wheel 115 adapted to ride on cam surface 42 of FIG. 1 to cause gate 40 to move from its open position to the solid-line closed position in FIGS. 7 and 8.

Movable latch blocks 120 and 121 are fixed on movable shaft 122 in FIGS. 7 and 8. Shaft 122 is slidably mounted in supports 124 and 125 (FIG. 7) which are welded to plate 101. A biasing spring 126 biases rod 122 to the right and toward the latching position shown in FIG. 7 in which latch blocks 120 and 121 are latched under latch plates 111 and 112 to hold the gate 40 erect and closed.

Shaft 122 is operated by a crank arm 130 which is pivotally mounted on a pivot pin 131 which is fixed in plate 132 which is welded to plate 101. Crank arm 130 then has a slot 133 which receives a pin 134 (FIG. 7) extending from shaft 122. Thus, rotation of crank arm 130 in a counterclockwise direction in FIG. 7 will move shaft 122 to the left to release latch plates 111 and 112 and to allow gate 40 to open.

Crank arm 130 is provided with a roller 140 for engaging appropriate solenoid-operated devices associated with exit devices 30 and gate 40 (FIGS. 1, 1a and 10), whereby the gate 40 can be unlatched to discharge the bundles in the cart, or to open the gate as it passes fixed latch operating device 41 as the carts pass over device 41.

Note that, when the gates are to be reclosed by cam 42, the gate 40 will move to its solid-line position, and the spring 126 will then move shaft 122 and latch blocks 120 and 121 to the latched position shown in FIG. 7.

Figure 10:
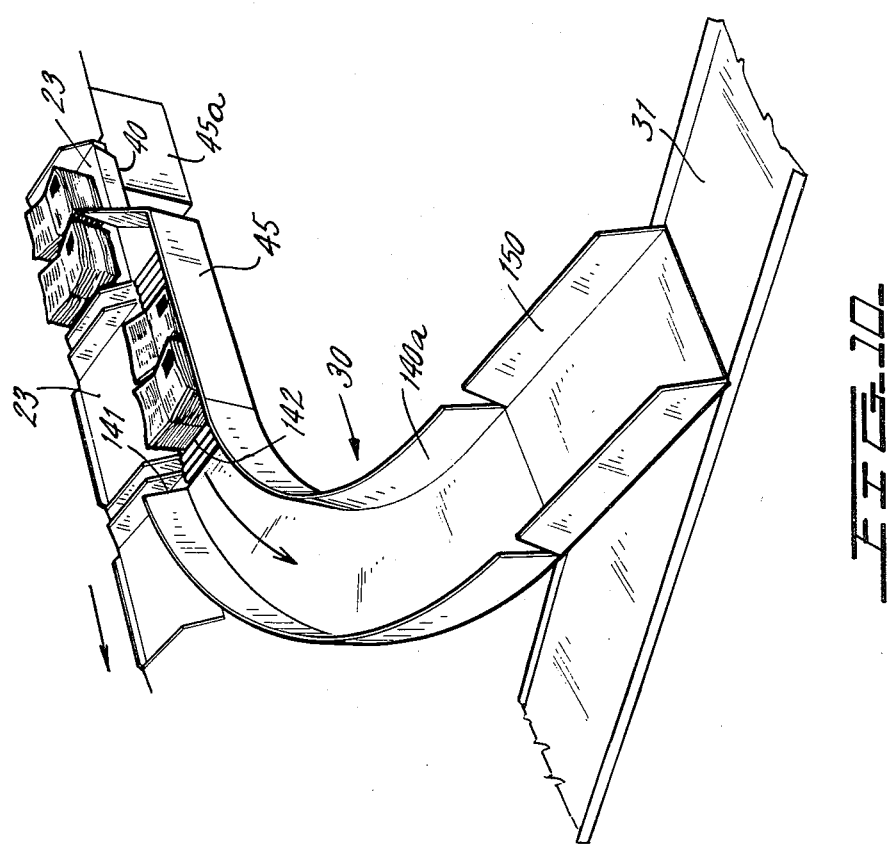
FIG. 10 is a perspective view of the discharge chute of the present invention.

A suitable latch-opening device can be associated in any desired manner with the control apparatus 45a of FIG. 10 and is disposed adjacent backboard 45. Thus, the exit device shown therein consists of a circular sheet metal chute 140a which has an entrance opening 141 extending along the path of carts 23. A roller conveyor section 142 extends along opening 141, and it is seen that two bundles were just ejected by gravity from the adjacent cart 23. Moreover, the following cart 23 has just had its gate 40 opened by latch release mechanism 45a, and its bundles will now fall, due to gravity, through opening 141 as the cart registers with the opening 141. Note in FIG. 10 that chute 140a has a section 150 that can be raised to allow straight-through operation of conveyors 19 and 31 in FIG. 1.

FIG. 9 shows the bundle entry device 22, particularly for the system of FIG. 1a, where the pacer 17 is at the level of the entry device. In FIG. 9, the pacer 17, upon reception of control signals that the entry device can accept bundles, supplies bundles on top of bundle moving chains 160 which moves bundles in the direction of movement of the cart train, to a position in front of pusher plate 161 (shown partly advanced in FIG. 9). Pusher plate 161 is carried by lateral chains 162, which operate when appropriate control electronics indicate that an empty cart to be loaded is available at the bundle entrance device. The chains 160 are then lowered and the plate 161 pushes toward the cart 23 to load two bundles into the cart as shown in FIG. 9. The pusher plate 161 immediately retracts (and is shown partly retracted in FIG. 9) to its rearward rest position where it can receive further bundles from pacer 17. Note that any desired entry mechanism could be used for loading bundles into the carts, and the schematically illustrated entry device is simply illustrative of the kind of mechanisms that can be used.

The drive mechanism for operating the cart train can take any desired form. However, one mechanism which lends itself to quiet, reliable operation is the caterpillar type device schematically illustrated in FIG. 11. Note that two such drives 50 are used in the system of FIG. 1. In FIG. 11, two steel tracks 170 and 171, covered by rubber pads, are driven by a motor 172 and engage the rubber strips 68 and 69 (FIG. 5) on the bottom of each cart 23 to propel the train in a quiet manner. Note that the wheels of each cart are slightly lifted from track 25 as they are engaged by belts 170 and 171.

Although this invention has been described with respect to preferred embodiments, it should be understood that many variations and modifications will now be obvious to those skilled in the art and, therefore, the scope of this invention is to be limited, not by the specific disclosure herein, but only by the appended claims.

The embodiment of the invention in which an exclusive privilege or property is claimed are defined as follows:

1. A conveyor system for conveying a stack from a stack loading means to a remotely positioned stack discharge means; said conveyor system comprising a train of stack receiving carts connected end to end and being angularly movable relative to one another, a closed track for receiving said train of carts and for guiding their motion around a closed path which passes said stack loading means at a first point in said closed path and which passes said stack discharge means at a second point in said closed path; and drive means for driving said train of carts around said closed path; each of said carts of said train of carts having a bottom surface for receiving at least one stack from said stack producing means and a lateral gate extending along one edge of said bottom surface and movable between an upright position for holding a stack in said cart and in an opened position for permitting the discharge of a stack from said cart; said gate open position comprising a lowered position in which said gate is substantially coplanar with said bottom surface; each of said carts having latch means for latching their said gate in their said upright positions, and latch defeating means for defeating said latch means and opening said gates of said carts; a gate closing means for closing and latching at least selected gates of said carts after said carts have passed said first point of said closed path and after loading of stacks in said carts, and gate latch defeating means operable for operating said latch defeating means of said gate latches of at least selected carts, thereby to open said gates of said selected carts at said second point in said closed path, and adjacent said stack discharge means and to enable the discharge of stacks from said selected carts at said second point; said track being normally horizontal and normally maintaining said carts with their said bottom surface horizontal to the ground at at least said second point; said track being tilted from the horizontal at said first point, whereby said track tilts said carts and their said bottom surface from the horizontal to cause said stacks to slide against said gates before said carts reach said first point in said path, whereby stacks are discharged from said carts by gravity when said gates are opened.

2. The system of claim 1 wherein said stack is a tied stack of newspapers.

3. The system of claim 2 wherein each of said carts has a length sufficient to receive at least two newspaper bundles thereon, arranged end to end.

4. The system of claim 2 wherein said second point contains a newspaper loading dock, and wherein said stack discharge means comprises a plurality of spaced discharge chutes, each leading to a separate loading region on said loading dock; and control means for controlling said gate latch defeating means to deliver predetermined numbers of stacks to said separate loading regions.

5. The system of claim 1 wherein said closed loop is entirely filled with said carts; said carts being pivotally coupled to one another end to end.

6. The system of claim 1 wherein said loading means and said discharge means are each on the outside of said closed path.

7. The system of claim 1 wherein said loading means and said discharge means are at different floor elevations in a building.

8. The system of claim 6 wherein each of said carts has an elongated friction band on the bottom thereof, and wherein said drive means comprises an endless belt disposed at a fixed location beneath said track and engageable with said elongated friction band of each of said carts as said carts pass over said fixed location.

* * * * *